United States Patent [19]
Oliver et al.

[11] Patent Number: 6,105,926
[45] Date of Patent: Aug. 22, 2000

[54] DIAPHRAGM ASSEMBLY DISC

[75] Inventors: Steven R. Oliver, Chicago; John R. Wilson, Naperville, both of Ill.

[73] Assignee: Sloan Valve Company, Franklin Park, Ill.

[21] Appl. No.: 09/376,380

[22] Filed: Aug. 18, 1999

[51] Int. Cl.[7] .................................................. F16K 31/12
[52] U.S. Cl. ............................................. 251/40; 251/45
[58] Field of Search ................................ 251/38, 40, 45, 251/61.1

[56] References Cited

U.S. PATENT DOCUMENTS

| | | |
|---|---|---|
| 1,114,398 | 10/1914 | Sloan . |
| 1,416,317 | 5/1922 | Banta . |
| 1,573,092 | 2/1926 | Russell . |
| 1,839,962 | 1/1932 | Groeniger et al. . |
| 1,912,937 | 6/1933 | George . |
| 1,991,100 | 2/1935 | Kelso . |
| 1,998,155 | 4/1935 | Cadwell et al. . |
| 2,075,026 | 3/1937 | Duncan, Jr. . |
| 2,270,259 | 1/1942 | Burke . |
| 2,433,507 | 12/1947 | Delany . |
| 2,472,576 | 6/1949 | Dobrick . |
| 3,085,779 | 4/1963 | Philippe et al. . |
| 3,406,940 | 10/1968 | Kertell . |
| 3,656,499 | 4/1972 | Nelson et al. . |
| 4,202,525 | 5/1980 | Govaer et al. . |
| 5,026,021 | 6/1991 | Pino . |
| 5,232,194 | 8/1993 | Saadi et al. . |
| 5,271,600 | 12/1993 | Saddi et al. ................................ 251/40 |
| 5,332,192 | 7/1994 | Whiteside .................................. 251/40 |
| 5,490,659 | 2/1996 | Whiteside . |
| 5,755,253 | 5/1998 | Gronwick ................................. 251/40 |
| 5,887,848 | 3/1999 | Wilson ...................................... 251/40 |

*Primary Examiner*—Kevin Shaver
*Assistant Examiner*—David A. Bonderer
*Attorney, Agent, or Firm*—McEachran, Jambor, Keating, Bock & Kurtz

[57] ABSTRACT

A diaphragm type flush valve for use with toilet devices such as urinals and water closets includes a body having an inlet and an outlet, a valve seat between the inlet and outlet, and a valve movable to a closing position on the valve seat to stop the flow between the inlet and outlet. The valve member includes a diaphragm peripherally attached to the body and a disc positioned on top of the diaphragm. There is a guide extending downwardly from the diaphragm. The disc is attached to the guide and functions to secure the diaphragm, disc and guide into the valve member. The disc includes a rigid body and a seal member, with the seal member having a portion on an upper surface of the disc for sealing contact with a relief valve, and a portion on a lower surface of the disc for contact with the diaphragm. The disc is attached to the guide through a one-way clutch which permits relative rotation of the disc and guide in one direction during assembly, and prevents relative rotation in the opposite direction after assembly.

20 Claims, 2 Drawing Sheets

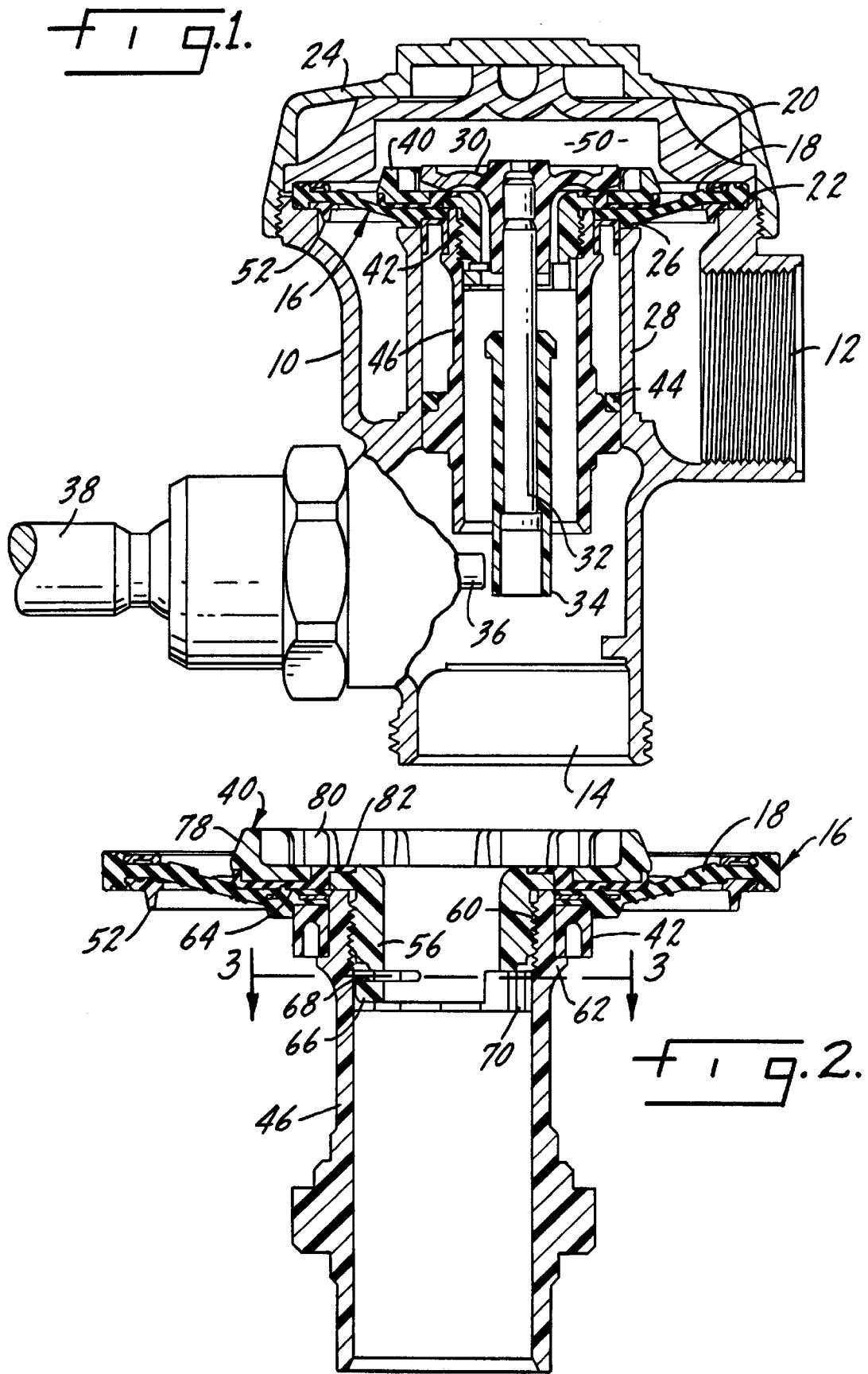

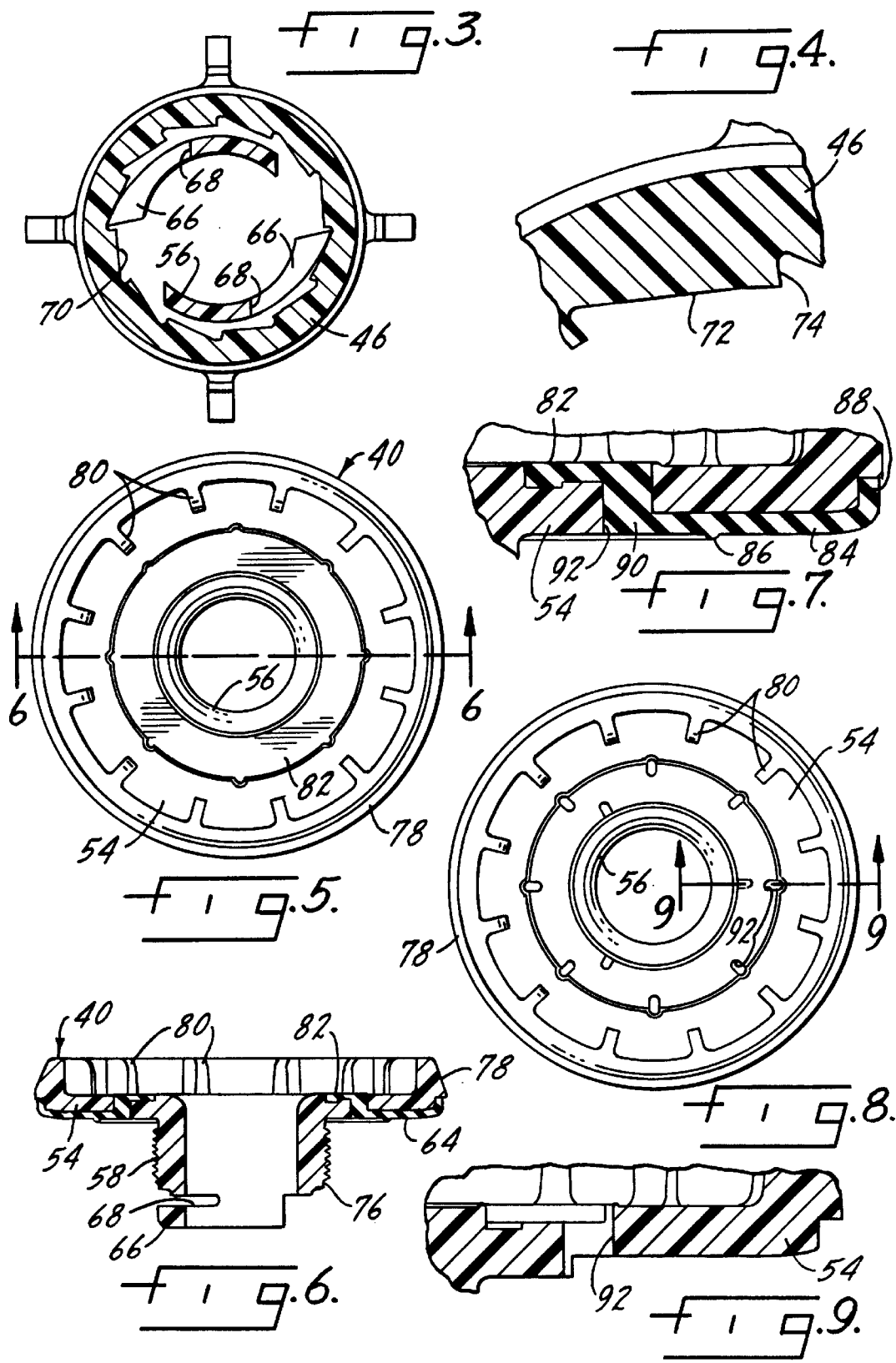

DIAPHRAGM ASSEMBLY DISC

FIELD OF THE INVENTION

The present invention relates to diaphragm type flush valves for use with toilet devices such as urinals and water closets and more specifically to an improved disc which is used to secure the guide, diaphragm and disc into a unitary assembly. In particular the invention relates to improving the accuracy of the flush valve, the chemical resistance of the flush valve components to corrosion and to a unique one-way clutch which prevents disassembly of the elements of the diaphragm assembly after they have been secured together.

SUMMARY OF THE INVENTION

The present invention relates to diaphragm type flush valves for use with toilet devices such as urinals and water closets and particularly to an improved disc which is used in the flush valve for securing the diaphragm to the guide.

A primary purpose of the invention is a disc as described, which provides ease of assembly of the diaphragm assembly components without the necessity of adhesive.

Another purpose is a diaphragm assembly for the use described which utilizes a one-way clutch to secure the disc to the guide to prevent disassembly thereof and reduces the potential for misassembled diaphragm kits.

Another purpose is an improved diaphragm assembly for the use described in which the disc has a seal member integrally molded therewith to provide adequate and responsive sealing between the disc and a relief valve and between the disc and the diaphragm.

Another purpose of the invention is to provide a disc for the use described which uses NSF-61 compliant materials, which materials provide improved chemical resistance to corrosive components in the water passing through the flush valve.

Other purposes will appear in the ensuing specification, drawings and claims.

DESCRIPTION OF THE DRAWINGS

The invention is illustrated diagrammatically in the following drawings wherein:

FIG. 1 is a partial an axial section through a flush valve of the type described;

FIG. 2 is an enlarged axial section through the diaphragm assembly;

FIG. 3 is a section along plane 3—3 of FIG. 2;

FIG. 4 is an enlarged partial view of the ratchet grooves on the interior of the diaphragm assembly guide;

FIG. 5 is a top view of the diaphragm assembly disc;

FIG. 6 is a section along plane 6—6 of FIG. 5;

FIG. 7 is a partial enlarged section illustrating the relationship of the seal component of the disc relative to the disc body;

FIG. 8 is a top view of the diaphragm assembly disc with the seal component removed; and FIG. 9 is a section along plane 9—9 of FIG. 8.

DESCRIPTION OF THE PREFERRED EMBODIMENT

The present invention relates to flush valves for use with toilet devices such as urinals and water closets and more specifically relates to an improved disc for use in the diaphragm assembly of such devices. U.S. Pat. No. 5,887,848, owned by Sloan Valve Company of Franklin Park, Ill., the assignee of the present application, discloses flush valves of this general type as do numerous other patents owned by the same assignee. The disclosure of the '848 patent is herein incorporated by reference.

The flush valve includes a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screw threaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30, having a downwardly extending stem 32 carrying a movable sleeve 34. Sleeve 34 is positioned for contact by a plunger 36 when moved by a handle 38 as is conventional in the operation of flush valves of the type described.

The diaphragm assembly 16, in addition to diaphragm 18 and the relief valve 30, includes a retaining disc 40, a refill ring 42 and a flow control ring 44. The connection between the retaining disc 40, the refill ring 42 and a cylindrical guide 46 will be described in detail hereinafter.

As is known in the art, when the handle 38 is operated, the plunger 36 will contact sleeve 34, lifting the relief valve 30 off of its seat on the retaining disc 40. This will permit the discharge of water within the pressure chamber 50 down thru the sleeve or guide 46. Inlet pressure will then cause the diaphragm to move upwardly off of its seat 26 permitting direct communication between inlet 12 and the outlet 14 through the space between the bottom of the diaphragm assembly and the seat 26. As soon as this operation has taken place, the pressure chamber 50 will begin to fill through a filter and bypass component of the diaphragm assembly, as shown and described in the above-referenced patent. As flow continues into the pressure chamber 50, the diaphragm assembly will move towards valve seat 26 and when it has reached that position, the flush valve will be in a closed position. It is important that the time period for which the flush valve is open be tightly controlled, so that the volume of water which passes through the valve in a single flushing operation can be held to the close tolerances required by the various state and federal regulations in place at the present time. The filter and bypass orifice may be formed in a peripheral member 52 which is located on the underside of the diaphragm and which is disclosed in more detail in application Ser. No. 08/964,002 filed Nov. 4, 1997. For purposes of the present application, what is important is that there be some form of filter and bypass orifice and the particular details are not relevant.

The retaining disc 40, which is shown in detail in FIGS. 2–9 includes a body 54 which has a downwardly extending cylindrical portion 56. The portion 56 is exteriorly threaded, as at 58, to mate with an interior thread 60 on the guide 46. The exterior of guide 46 has a shoulder 62 which supports the refill ring 42, as shown particularly in FIG. 2, with the upper surface of the refill ring supporting the underside of the diaphragm 18. The diaphragm is captured between the described surface on the refill ring 42 and a lower surface 64 on the retaining disc 40, again as shown particularly in FIG. 2. Thus, the retaining disc is threaded to the guide, the guide supports the refill ring 42, and the diaphragm is captured between the top of the refill ring 42 and the lower surface of the guide, with this combination of elements, together, forming the diaphragm assembly 16.

Near the lower end of the downwardly extending cylindrical portion 56 of the retaining disc, there are a pair of oppositely disposed arcuately extending pawls 66, shown particularly in FIG. 3. The pawls 66 are integral with the cylindrical portion 56, but separated to provide flexibility, by gaps 68, shown in FIG. 6. Thus, the pawls may flex inwardly and outwardly during the ratcheting of the guide to the fully assembled position of FIG. 2. The interior surface of the guide 46, in alignment with the pawls 66, has a ratchet surface formed of a plurality of uniformly spaced ratchet grooves 70, shown in FIG. 3 and in more detail in FIG. 4. Each of the grooves has an inwardly slanted surface 72 bounded by inwardly extending projections 74, which elements, in combination, form a plurality of teeth, which interact with the pawls as shown particularly in FIG. 3. When the disc is assembled with the diaphragm and guide, the disc may be rotated in a clockwise direction, as the parts are viewed in FIG. 3, with the result that the pawls will not inhibit relative rotation between the disc and the guide. However, once these two elements are fully assembled into the FIG. 2 position, there can be no counter clockwise relative rotation therebetween. The ratchet grooves and the pawls form a one-way clutch which provides for ease of assembly, but prevents disassembly once the diaphragm disc and guide are attached together.

The initial thread of the threaded area 58, as indicated at 76, may be blunt to provide ease of starting the threading movement of the disc into the guide. In addition, the effect of the extension of the cylindrical portion 56 of the disc body is to extend the disc further into the guide, again aiding in assembly of these two members.

The disc 40 has an integrally molded seal. The combination of the disc and its seal are shown in FIGS. 5, 6 and 7 and the disc without the seal is shown in FIGS. 8 and 9. The disc includes the body 54, as described, which may have an outward tapered surface 78, again for ease of assembly of the diaphragm assembly. There are a plurality of inwardly directed ribs, integral with the body 54, the ribs being shown at 80, with the ribs functioning to center the relief valve 30 to provide more effective and consistent operation of the flush valve. The body 54 is rigid and may be formed of a 25% glass filled polypropylene, although the invention should not be so limited. The disc seal has an upper surface portion 82, shown in FIG. 7, and a lower surface portion 84, again shown in FIG. 7. The upper surface portion 82 will support the relief valve 30 and form a seal with the relief valve to close off the pressure chamber 50. The lower surface portion 84, which may have a peripheral sealing bead 86, will seat upon the diaphragm 18 and form a seal with the diaphragm and will be compressed against the diaphragm by the disc/guide connection thru the described threads and the one-way clutch. The seal may extend about the exterior of the disc to its outside periphery, as indicated at 88 in FIG. 7. The seal and body may be molded together with the upper and lower sealing surfaces joined by portions of the seal indicated at 90 which are located in a plurality of passages 92, shown particularly in FIGS. 8 and 9, which extend through the body of the disc. Thus, the seal may be molded over the disc body to provide a complete unit. Preferably the seal may be made of TPE (thermal plastic elastomer) or any other suitable sealing material. It is important that the seal material, as well as the material forming the body, be formed of materials which meet NSF-61 specifications and will prevent any corrosive or undesired chemical activity with the water flowing through the flush valve.

Of particular importance in the invention, is the fact that the seal on the disc has two spaced sealing surfaces, with the seal being an integrally molded element with the body of the disc. Also of importance is the one way clutch which prevents undesirable disassembly of the diaphragm assembly in the field. The one way clutch permits ease of assembly at the factory, but prevents undesirable disassembly in the field.

Whereas the preferred form of the invention has been shown and described herein, it should be realized that there may be many modifications, substitutions and alterations thereto.

What is claimed is:

1. A diaphragm type flush valve for use with toilet devices such as urinals and water closets, including a body having an inlet and an outlet, a valve seat between said inlet and outlet and a valve member movable to a closing position on said valve seat to stop flow between said inlet and outlet, said valve member including a diaphragm peripherally attached to said body, a pressure chamber above said diaphragm for holding said valve member on said valve seat, a disc positioned on top of said diaphragm, a guide extending downwardly from said diaphragm, said disc being attached to said guide and functioning to assemble said diaphragm, disc and guide into said valve member, said disc including a rigid body and a seal member, said seal member having a portion on an upper surface of said disc for sealing contact with a relief valve extending through said disc and guide, said disc having a portion on a lower surface thereof for contact with said diaphragm.

2. The flush valve of claim 1 wherein said seal member upper surface portion and lower surface portion are integral and are connected through spaced passages formed in said disc body.

3. The flush valve of claim 1 wherein said seal member lower surface portion has a circumferentially extending, downwardly directed, sealing bead for contact with said diaphragm.

4. The flush valve of claim 1 wherein said disc is attached to said guide through a one-way clutch which permits relative rotation of said disc and guide in one direction during assembly, and prevents relative rotation between said disc and guide in the opposite direction after assembly.

5. A diaphragm type flush valve for use with toilet devices such as urinals and water closets including a body having an inlet and an outlet, a valve seat between said inlet and outlet and a valve member movable to a closing position on said valve seat to stop flow between said inlet and outlet, said valve member including a diaphragm peripherally attached to said body, a pressure chamber above said diaphragm for holding said valve member on said valve seat, a disc positioned on top of said diaphragm, a guide extending downwardly from said diaphragm, said disc being attached to said guide and functioning to secure said diaphragm, disc and guide into said valve member, said disc being attached to said guide through a one-way clutch which permits relative rotation of said disc and guide in one direction during assembly and prevents relative rotation between said disc and guide in the opposite direction after assembly.

6. The flush valve of claim 5 wherein said valve member includes a threaded connection between said guide and disc.

7. The flush valve of claim 5 wherein said one-way clutch includes at least one arcuate pawl and a plurality of ratchet grooves.

8. The flush valve of claim 7 wherein said arcuate pawl is located on said disc and said ratchet grooves are located on said guide.

9. The flush valve of claim 8 wherein said disc includes, on an interior portion thereof, a pair of oppositely disposed arcuately extending pawl members.

10. The flush valve of claim 9 wherein said guide is generally cylindrical and has, on an interior surface thereof, a plurality of uniformly disposed ratchet grooves.

11. A valve member assembly for use in a toilet device flush valve for closing upon a seat thereof including a diaphragm, a disc positioned on top of said diaphragm, a guide extending downwardly from said diaphragm, said disc being attached to said guide and functioning to secure said diaphragm, disc and guide into said valve member, said disc including a rigid body and a seal member, said seal member having a portion on an upper surface of said disc for sealing contact with a relief valve, and a portion on a lower surface of said disc for contact with said diaphragm.

12. The flush valve of claim 11 wherein said seal member upper surface portion and lower surface portion are integral and are connected through spaced passages formed in said body.

13. The flush valve of claim 11 wherein said seal member lower surface portion has a circumferentially extending, downwardly directed, sealing bead for contact with said diaphragm.

14. The flush valve of claim 11 wherein said disc is attached to said guide through a one-way clutch which permits relative rotation of said disc and guide in one direction during assembly, and prevents relative rotation between said disc and guide in the opposite direction after assembly.

15. A valve member assembly for use in a toilet device flush valve for closing upon a seat thereof including a diaphragm, a disc positioned on top of said diaphragm, a guide extending downwardly from said diaphragm, said disc being attached to said guide and functioning to secure said diaphragm, disc and guide into said valve member, said disc being attached to said guide through a one-way clutch which permits relative rotation of said disc and guide in one direction during assembly, and prevents relative rotation in the opposite direction after assembly.

16. The flush valve of claim 15 wherein said valve member includes a threaded connection between said guide and disc.

17. The flush valve of claim 15 wherein said one-way clutch includes at least one arcuate pawl and a plurality of ratchet grooves.

18. The flush valve of claim 17 wherein said arcuate pawl is located on said disc and said ratchet grooves are located on said guide.

19. The flush valve of claim 18 wherein said disc includes, on an interior portion thereof, a pair of oppositely disposed arcuately extending pawl members.

20. The flush valve of claim 19 wherein said guide is generally cylindrical and has, on an interior surface thereof, a plurality of uniformly disposed ratchet grooves.

\* \* \* \* \*